United States Patent [19]

Assaf et al.

[11] Patent Number: 5,392,611
[45] Date of Patent: Feb. 28, 1995

[54] METHOD OF AND APPARATUS FOR REDUCING THE HEAT LOAD ON A GREENHOUSE

[75] Inventors: Gad Assaf, Rehovot; Benjamin Doron, Jerusalem, both of Israel

[73] Assignee: Geophysical Engineering Company, Seattle, Wash.

[21] Appl. No.: 581,928

[22] Filed: Sep. 12, 1990

Related U.S. Application Data

[63] Continuation-in-part of Ser. No. 350,449, May 11, 1989, abandoned, which is a continuation-in-part of Ser. No. 309,159, Feb. 13, 1989, Pat. No. 5,050,390, which is a continuation of Ser. No. 600,882, Apr. 19, 1984, Pat. No. 4,803,846.

[51] Int. Cl.$^6$ .......................... F25D 17/06
[52] U.S. Cl. .......................... 62/94; 62/271; 237/81
[58] Field of Search .......... 47/17; 62/94, 95, 272, 62/271; 237/213; 98/40.19

[56] References Cited

U.S. PATENT DOCUMENTS

| | | |
|---|---|---|
| 2,017,027 | 10/1935 | Forrest . |
| 3,949,522 | 4/1976 | Kehl et al. .......... 98/40.19 |
| 4,305,235 | 12/1981 | Roston . |
| 4,567,732 | 2/1986 | Landstrom et al. . |
| 4,685,617 | 8/1987 | Assaf . |
| 4,819,447 | 4/1989 | Assaf . |

FOREIGN PATENT DOCUMENTS

| | | |
|---|---|---|
| 0038213 | 4/1981 | European Pat. Off. . |
| 0123447 | 3/1984 | European Pat. Off. . |
| 0397458 | 11/1990 | European Pat. Off. . |
| 58-201922 | 11/1983 | Japan . |
| 61-19432 | 1/1986 | Japan . |

OTHER PUBLICATIONS

Abstract of Japanese Patent Laid-Open No. 61-19432.
Abstract of Japanese Patent Laid-Open No. Sho 58-201922.
Search Report issued by the Japanese Patent Office regarding Japanese Application No. 2-122765.
European Search Report.
Stranghellini, "Evaporation of a Greenhouse Crop and Its Relationship to the Supply of Heat," Research Report 83-6, Institute of Agricultural Engineering, The Netherlands (Publication date unknown).

*Primary Examiner*—Denise L. Gromada
*Attorney, Agent, or Firm*—Sandler, Greenblum & Bernstein

[57] ABSTRACT

A method for controlling the condition of air in an enclosure, such as a greenhouse, containing growing plants involves reducing the heat load on the enclosure by reducing the rate of convective heat flow of air across the canopy of the plants. This is achieved by heating and dehumidifying the air in the greenhouse during periods of low light levels such as at night in a manner that minimizes ventilation for controlling humidity. Apparatus is also provided for controlling the condition of air in an enclosure using an air-brine-vapor direct contact heat exchanger. Regeneration of the brine from the heat exchanger can be achieved by heating the brine using heated air from the enclosure or hot flue gases such that latent heat and/or sensible heat contained in the air, gases, and/or vapor exiting the regenerator can be transferred to the sir in the enclosure.

93 Claims, 8 Drawing Sheets

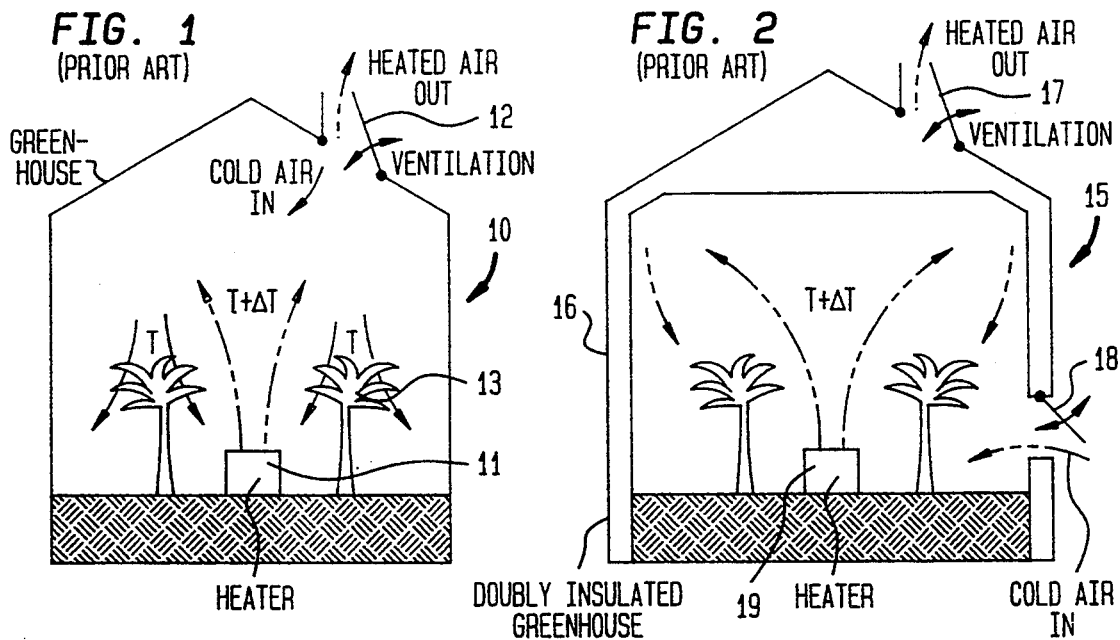
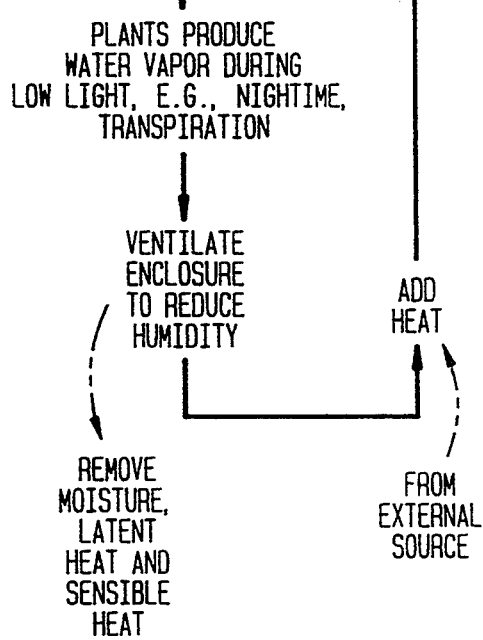
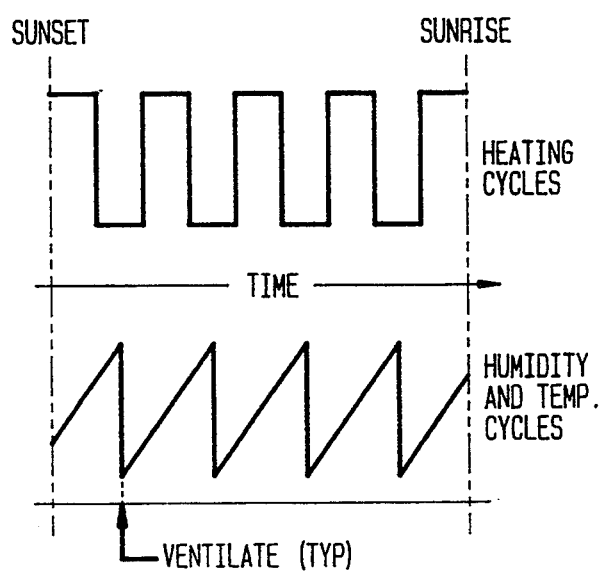

AIR ENTERING ENCLOSURE

AIR EXITING REGENERATOR

SEAM

AIR ENTERING ENCLOSURE

AIR EXITING REGENERATOR

BRINE FLOWING FROM REGENERATOR

BRINE FLOWING TO REGENERATOR

PREHEATER

METHOD OF AND APPARATUS FOR REDUCING THE HEAT LOAD ON A GREENHOUSE

RELATED APPLICATIONS

This application is a continuation-in-part of application Ser. No. 350,449, filed May 11, 1989, now abandoned, which is a continuation-in-part of Ser. No. 309,159, filed Feb. 13, 1989, now U.S. Pat. Ser. No. 5,050,390), which itself is a continuation of application Ser. No. 600,882, filed Apr. 16, 1984, (now U.S. Pat. No. 4,803,846, granted Feb. 14, 1989). The subject matter of each of Ser. Nos. 309,159, and 350,159, is hereby incorporated by reference.

This subject matter of this application is also related to the subject matter of applications Ser. No. 294,114 filed Jan. 6, 1989, and Ser. No. 316,915 filed Feb. 28, 1989. The subject matter of each of Ser. Nos. 292,114 and 316,915 is hereby incorporated by reference.

TECHNICAL FIELD

This application generally relates to a method of and apparatus for controlling the condition of air in an enclosure, and more particularly, is concerned with a method of and apparatus for reducing and/or controlling the heat load on greenhouses or enclosures containing plants, or other sources of moisture, especially during periods of low light levels, such as at night.

BACKGROUND OF THE INVENTION

Agricultural products, such as vegetables and flowers, are grown on a large scale in greenhouses throughout the world. During daylight hours, the agricultural products growing in a greenhouse introduce water vapor into the greenhouse and extract carbon dioxide from the air therein. Often, the addition of heat to a greenhouse on a daily basis is required depending on geographical location and season of the year. In some locations, heat is needed only at night.

To reduce the heat load on a greenhouse, it is conventional to seal the greenhouse with plastic film to obtain a reasonably insulated structure at a moderate price. This situation is illustrated in FIG. 1 which shows the provision of a conventional space heater in a greenhouse for the purpose of heating the greenhouse. An improved arrangement is shown in FIG. 2 wherein the greenhouse is doubly insulated with plastic film. Regardless of the degree of insulation, experience shows that in heated greenhouses at night, the plants are often warmer than the ambient air outside the greenhouse, and that the humidity level inside the greenhouse is considerably elevated due to the transpiration rate of the plants even in their quiescent state under conditions of low light intensity. The more securely a greenhouse is sealed, the greater is the enhancement of condensation heat flux to the walls of the greenhouse and the cold portions of the plants. In order to inhibit plant diseases due to high humidity conditions, removal of excess water vapor is achieved by ventilation of the greenhouse during the night. Ventilation of this type usually is carried out periodically. Such conditions also occur during periods of rather cold weather when the light level is low. Often, periodic ventilation is also commonly used during these periods to remove excess water vapor.

During ventilation of a greenhouse, buoyant warm, moist air adjacent the ceiling of the greenhouse is removed through a selectively operable vent in the ceiling, this air being replaced by the colder, more dense outside air that flows toward the floor and the plants in the greenhouse. The humidity inside the greenhouse is thus reduced, but at a cost of a reduction in temperature inside the greenhouse. To maintain a suitable temperature for the growing plants, heaters are provided and operated to return the internal temperature of the greenhouse to a suitable level. Often, heating of the enclosure air as well as venting is repeated cyclically during the night-time or such periods as suggested in FIG. 4 which is a highly idealized time chart showing the cyclical heating and cooling of the interior of such a greenhouse. In the chart in the upper portion of FIG. 4, the operation of the heater is shown; and, the chart in the lower portion of FIG. 4 shows the resultant cyclical changes in humidity and temperature inside the greenhouse on the basis that ventilation occurs periodically.

From actual experience, the heat load on the greenhouse is not inconsequential. This can be appreciated by considering that the moist air removed during ventilation contains a considerable amount of heat that is lost to the atmosphere: the latent heat contained in the vented vapor, and the sensible heat in the air. This lost heat must be replaced by a heater.

The heat load on the greenhouse can be reduced by utilizing direct contact air-brine-vapor heat exchangers in the greenhouses for the purpose of reducing humidity and which may be used in the manner described below. During the day, brine in the heat exchanger will be hygroscopic because the vapor pressure at the air/brine interface at a given temperature will be less than the vapor pressure of vapor in the air at the same temperature. This approach to a more efficient use of the latent condensation of the vapor in a greenhouse is disclosed in U.S. Pat. No. 4,707,995 granted Nov. 24, 1987, and in U.S. Pat. No. 4,819,447 granted Apr. 11, 1989, the subject matter of these patents being hereby incorporated by reference. These patents disclose temporarily storing, in the brine present in the enclosure, latent heat liberated by the condensation of vapor on the brine, and contacting the air in the enclosure with the brine during the night when the air in the enclosure normally will be cooler than the brine. Heat extracted from the greenhouse during the day and temporarily stored in the brine is thus transferred, at night, back to the air in the enclosure by a reduction in the sensible heat of the brine. Such an approach can also be used during periods of rather cold weather and also during periods of low light levels.

While this approach provides a reduction in the heat load on the greenhouse, it also raises the possibility that the brine used in the greenhouse at night will be at a temperature such that the brine will not be hygroscopic. As a consequence, while the heat extracted from the greenhouse during the day by the condensation of water vapor on concentrated brine is stored and returned to the enclosure at night, additional water vapor may be introduced into the greenhouse at night by the evaporation of water from the brine. In such a situation, ventilation at night would be required to also remove such extra water vapor and to maintain the humidity in the greenhouse at a level which inhibits various types of plant diseases.

Much effort has been expended in efforts to reduce the heat loads in greenhouses occasioned by the necessity for their ventilation. It is therefore an object of the present invention to provide a new and improved method of an apparatus for reducing the heat load on a greenhouse, particularly during periods of low light levels.

BRIEF DESCRIPTION OF THE INVENTION

According to the present invention, the heat load on an enclosure containing plants is reduced by reducing the buoyancy flux throughout the enclosure which is generated by thermal gradients in the enclosure which produce thermal convective air currents across the plant canopy, or in the vicinity of the plants. It has been found, experimentally, that the transpiration of plants in an enclosure and thus the amount of moisture the plants introduce into the air can be reduced by reducing the rate of convective heat flow or buoyancy flux throughout the enclosure, and in particular, across the canopy of the plants.

A reduction in the flow of convective heat is achieved by steps that eliminate or significantly reduce the necessity for venting the greenhouse or enclosure, particularly during periods of low light levels such as at night-time. This can be achieved by heating at a reduced rate, and dehumidifying the air in an enclosure during these periods.

BRIEF DESCRIPTIONS OF THE DRAWING

Embodiments of the present invention are disclosed in the accompanying drawings wherein:

FIG. 1 represents a conventional greenhouse provided with the usual type of sealing features;

FIG. 2 represents what is termed a doubly-sealed greenhouse of conventional design;

Figure 5:
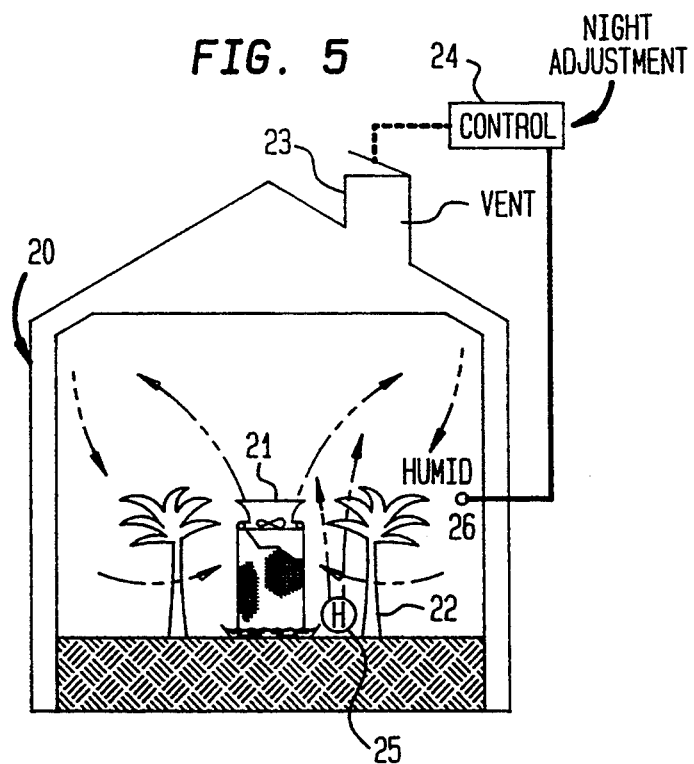
Figure 6:
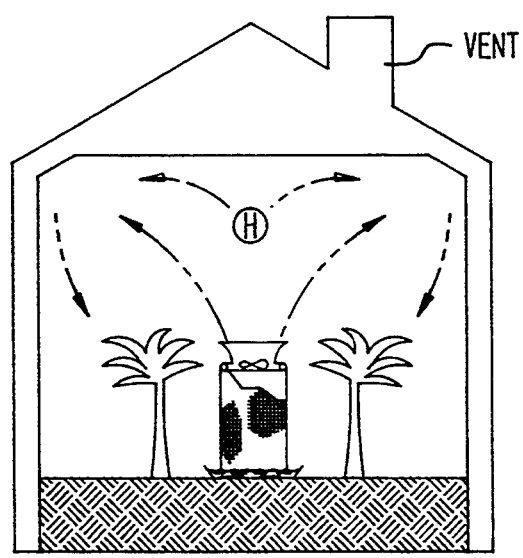
Figure 7:
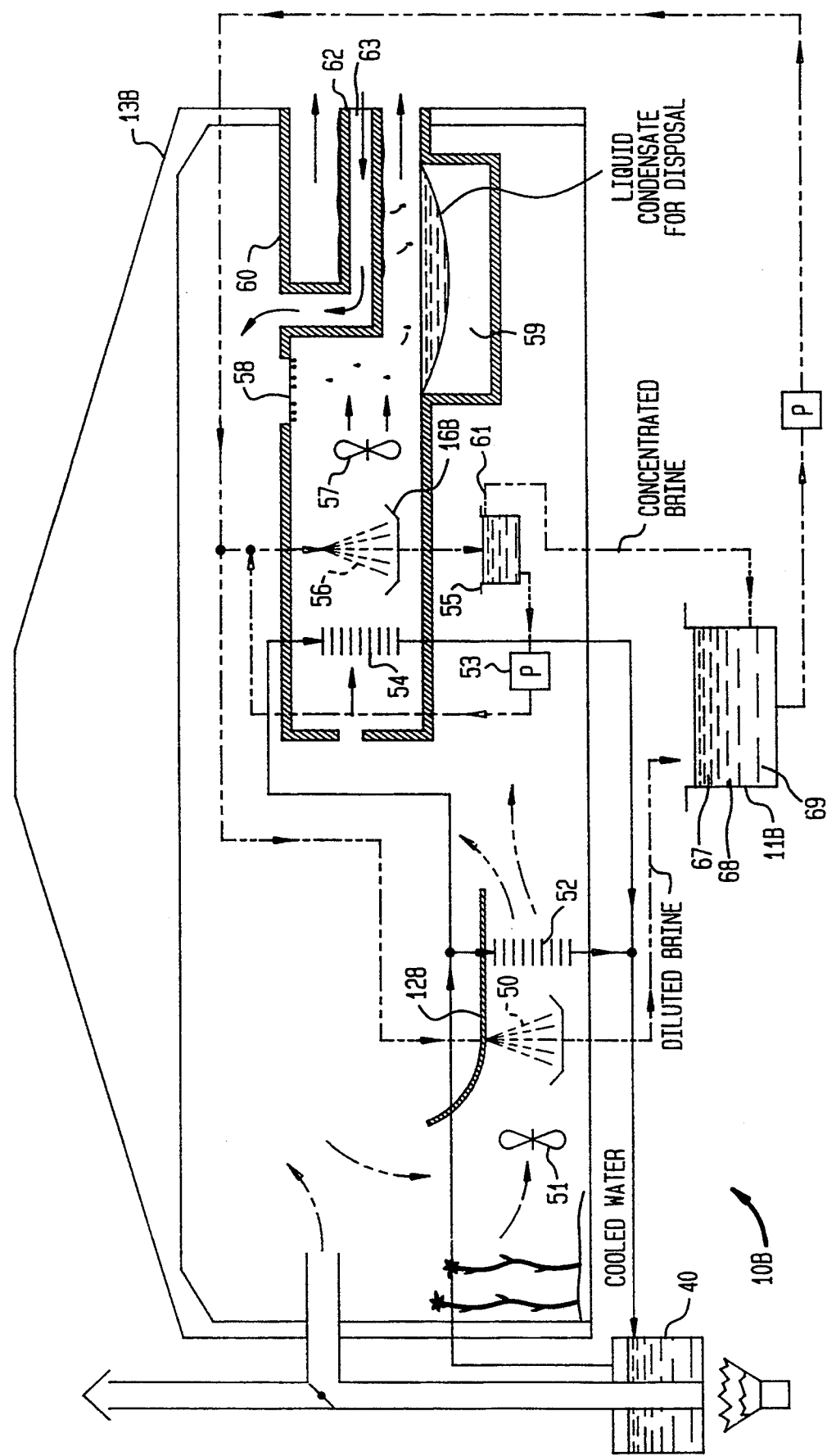
Figure 7B:
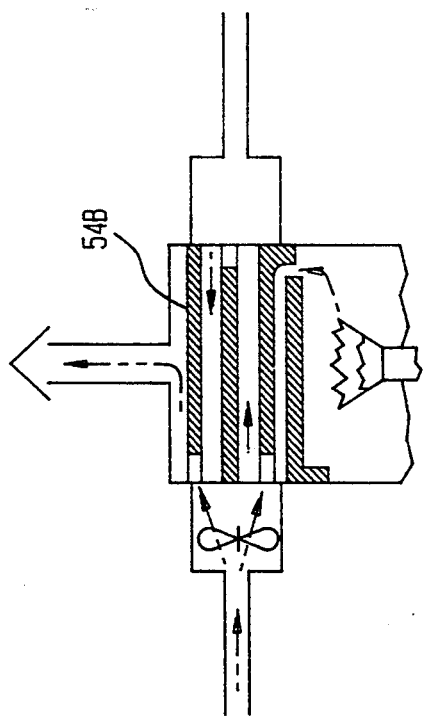
Figure 7A:
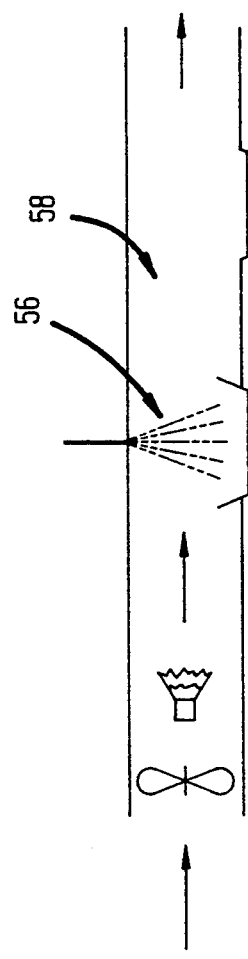
Figure 8:
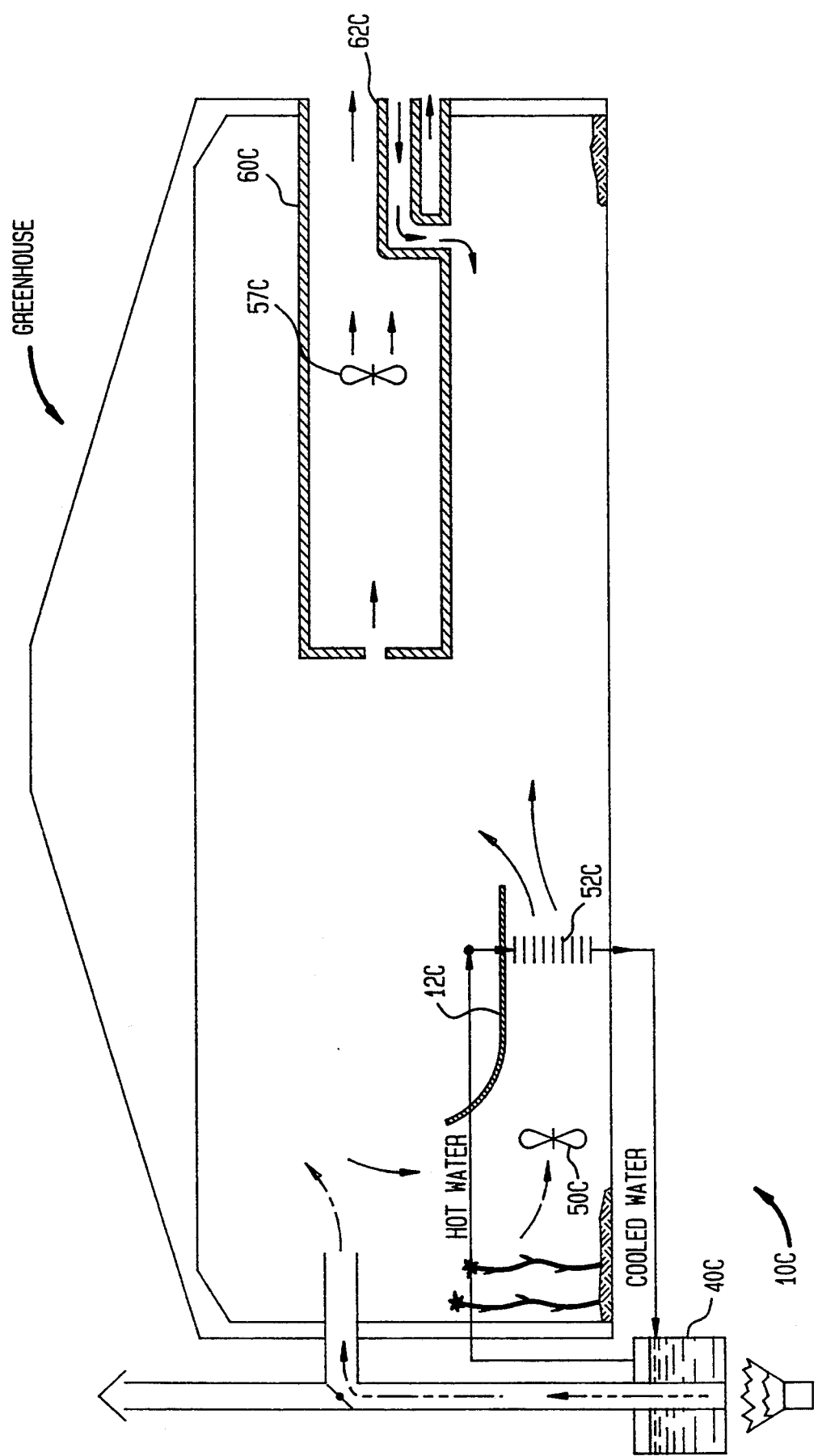
Figure 9:
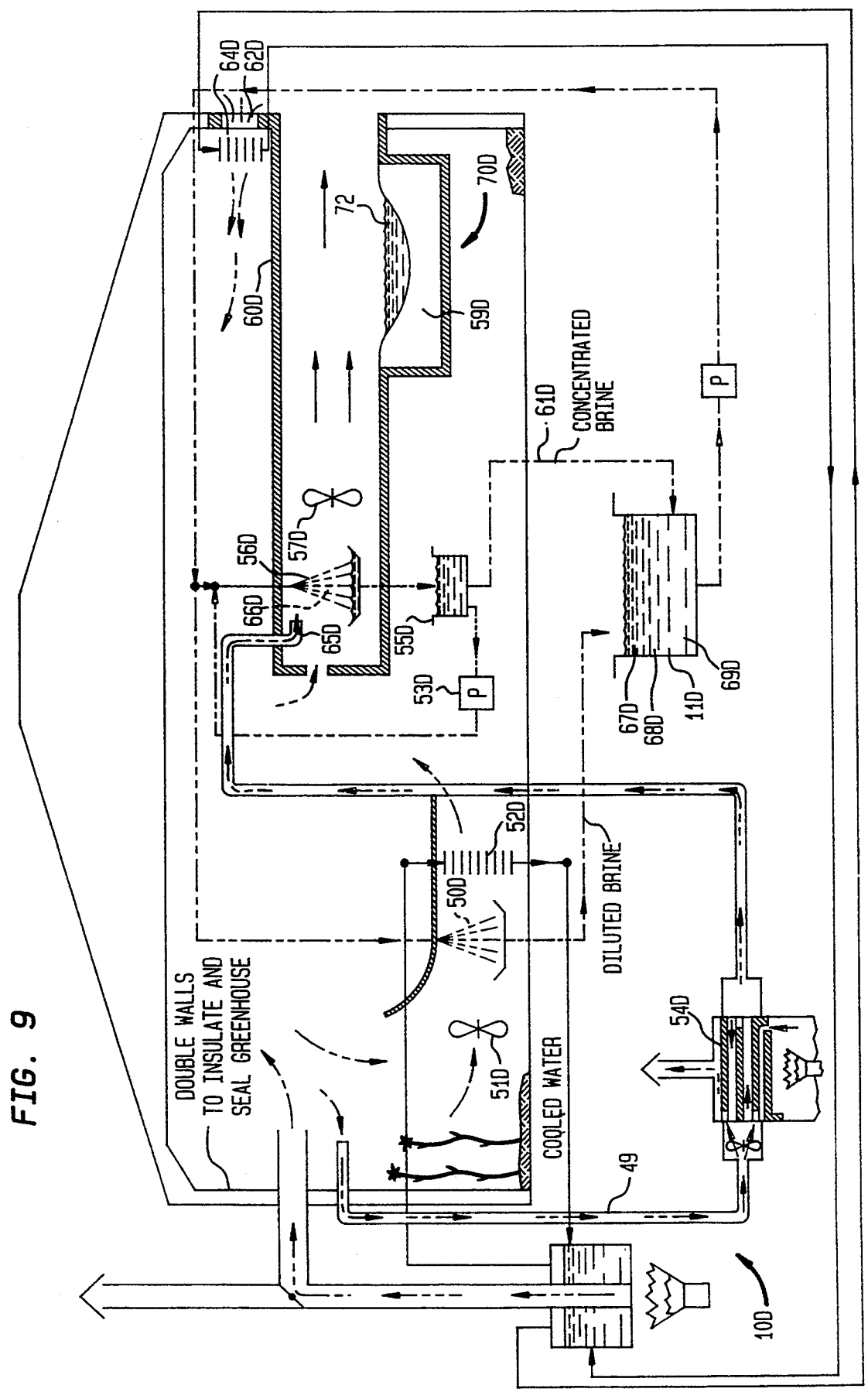

FIG. 3 is a flow chart illustrating the positive feedback situation that exists during periods of low light levels such as at night whereby the transpiration of plants during such periods increases the humidity and requires ventilation to reduce the humidity, the ventilation requires the addition of heat from an external source which itself increases the convective heat flow in the enclosure, and also through the canopy of the plants encouraging further transpiration, and the further transpiration produces the need for further ventilation;

FIG. 4 represents two charts showing heating cycles, and showing humidity and temperature cycles in a greenhouse as a consequence of the periodic venting and heating of the greenhouse during periods of low light levels such as at night;

FIG. 5 is a section through an enclosure such as a greenhouse in which a heater is placed near ground level, and an air-brine-vapor heat exchanger is used for the purpose of dehumidifying the air in accordance with the present invention;

FIG. 6 is a section through an enclosure such as a greenhouse similar to the section in FIG. 5 but showing an elevated heater; and FIG. 7 is a schematic diagram of an enclosure such as a greenhouse for the purpose of illustrating the control of the environment in the enclosure according to the present invention;

FIG. 7A is a schematic showing of a heater for use in regenerating brine in conjunction with the embodiment of the invention shown in FIG. 7;

FIG. 7B is a schematic showing of another type of heater for use in regenerating brine in conjunction with the embodiment of the invention shown in FIG. 7;

FIG. 8 is a section through an enclosure, such as a greenhouse illustrating the control of the environment in the enclosure in accordance with a further embodiment of the present invention;

FIG. 9 is a schematic diagram of an enclosure, such as a greenhouse, in accordance with a still further embodiment of the present invention.

Figure 9A:
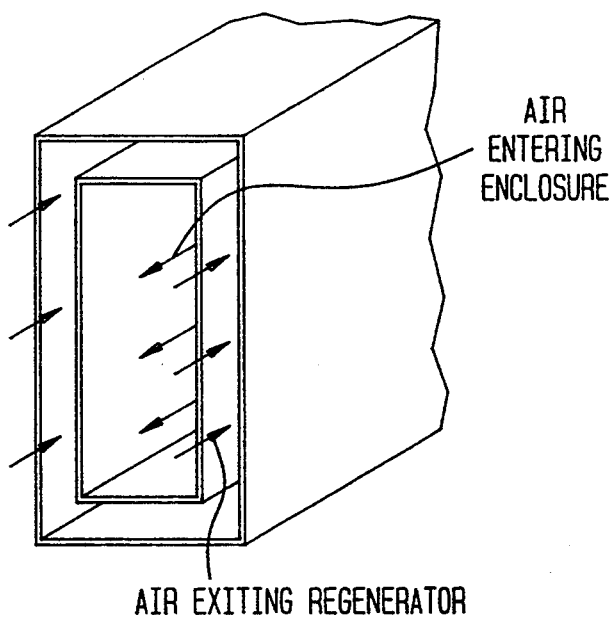
Figure 9B:
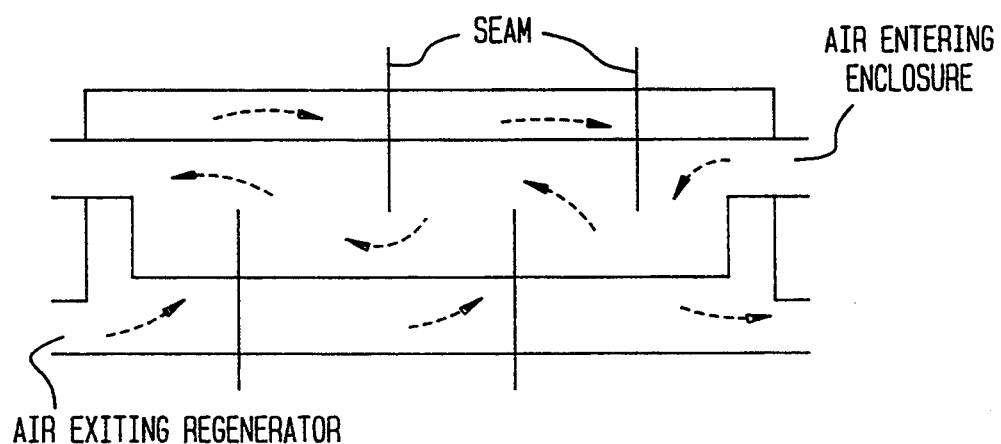
Figure 9C:
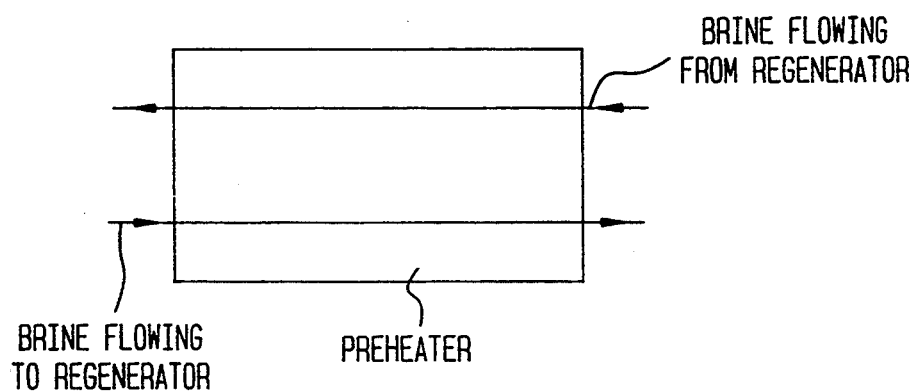
Figure 10:
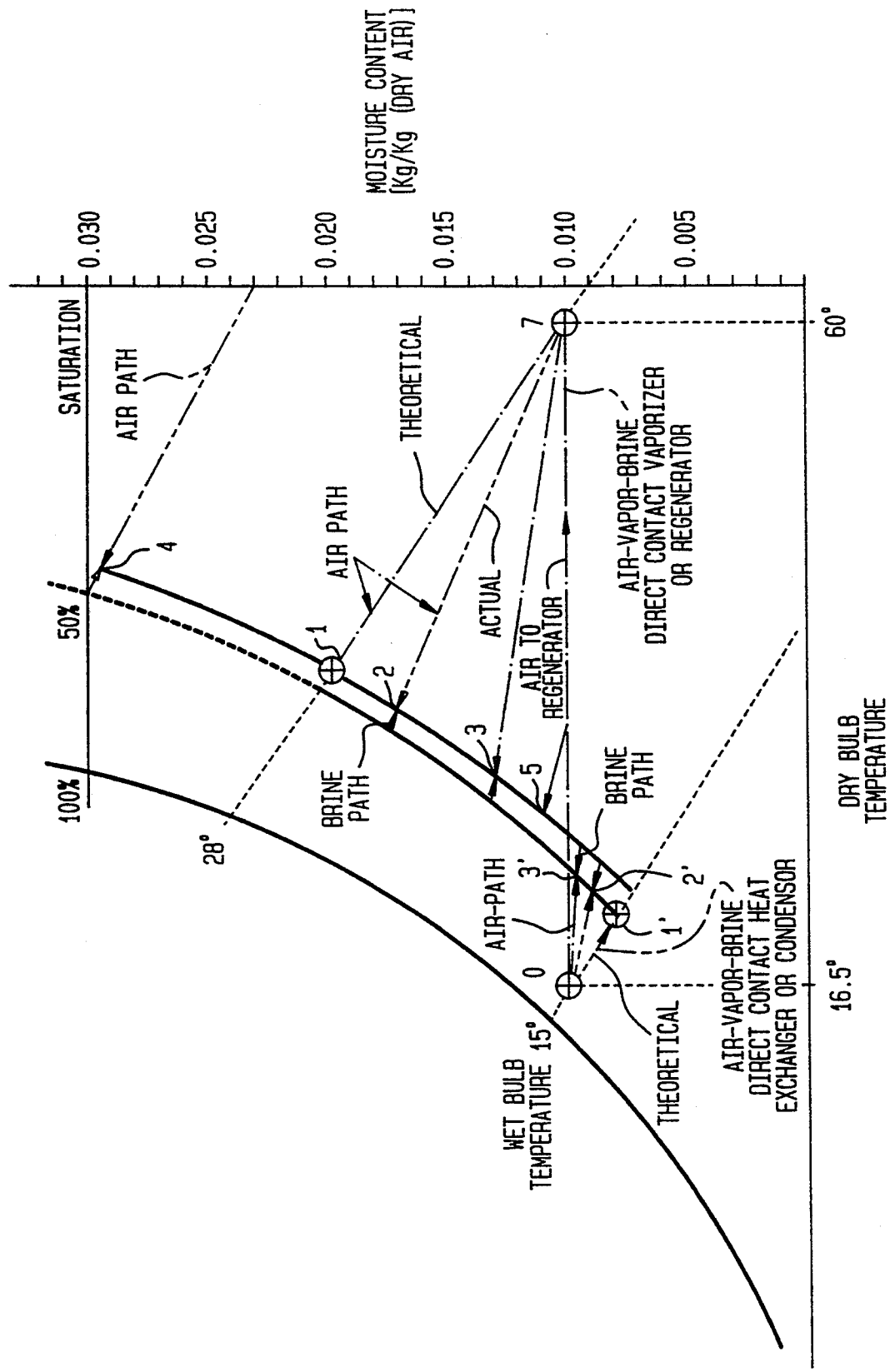

FIG. 9A is a schematic diagram of an indirect heat exchanger used in an embodiment of the present invention for transferring heat to air in an enclosure;

FIG. 9B is a cross-sectional view of a type of indirect heat exchanger shown in FIG. 9A;

FIG. 9C is a schematic diagram of a brine preheater in accordance with the present invention; and FIG. 10 is a psychrometric chart showing the operation of the present invention when used to condition air in an enclosure.

DETAILED DESCRIPTION

Referring now to FIG. 1, reference numeral 10 designates a conventional greenhouse having a single layer of plastic film or glass insulation, a conventional heating unit 11 located at ground level, and a conventional ventilation system in the form of a selectively operable flap 12 in the ceiling of the greenhouse. Plants 13 are shown growing at ground level in the greenhouse. For reference purposes, substantially the total height of the plants including the flower buds and leaves, when flowers are concerned, or the total height of the fruits or vegetables and leaves, when fruit or vegetables are concerned, constitute what is termed the "plant canopy".

Preferably, a control system is utilized for the purpose of selectively operating flap 12 to effect the venting of the greenhouse. When the flap is opened, warm, moist air in the upper reaches of the greenhouse rises through the opening in the ceiling and is usually replaced by cooler, more dense and drier air that flows downwardly.

Reference character 15 in FIG. 2 shows a well insulated greenhouse in that a double layer 16 of plastic film or glass is used. This type of greenhouse is typically provided with selectively operable ceiling vent 17 and side inlet 18. Ground level heater 19 is provided to heat the greenhouse as a consequence of its periodic ventilation to reduce the humidity.

Investigation has revealed that in greenhouses constructed in accordance with the configuration shown in FIG. 1, a relatively small amount of ventilation during periods of low light levels such as at night is required, but there is a large amount of condensation on the wall of the greenhouse, and the rate of plant transpiration is relatively large.

For greenhouses configured as shown in FIG. 2, a relatively large amount of ventilation during periods of low light levels such as at night is required, and the transpiration rate is relatively large. In both cases, the heat load on the greenhouse is relatively large because of the ventilation required to maintain the humidity during such periods at acceptable levels for plant health. Such ventilation exhausts latent and sensible heat from the greenhouse which must be replaced by heating.

Experimental investigation has revealed that plant transpiration during periods of low light levels is highly correlated with the buoyancy flux in the greenhouse. "Buoyancy flux" is manifested by vertical movement of air through the plant canopy, either upwardly or downwardly, due to differences in temperature of the air in the greenhouse. Such movement occurs, for example, when a greenhouse is vented for a short time at night to reduce humidity in order to suppress fungal diseases, and then heated by an indirect contact heat exchanger. The result is a turbulent mixing of colder outside air with warmer inside air until thermal equilibrium is reestablished. Such mixing involves colder air flowing downwardly through the plant canopy in some parts of the greenhouse while warmer air flows upwardly in other parts.

During this period of thermal instability in the greenhouse, i.e., during the time that buoyancy flux exits in the greenhouse, the temperature of the air flowing through the canopy will fluctuate with time, and consequently, the temperature of the plant foliage also fluctuates. It is these temperature differences (in space) and fluctuations (in time) that are believed to significantly influence the degree of transpiration, which is the transfer of water by plants to the air.

As is well known, most water loss occurs from the leaves, and particularly through the stomates of the plants which are minute pores abundantly present in the epidermis of leaves. When the stomates are open, water vapor in the air-filled intercellular spaces in the leaf structure will diffuse through the stomates into the air if the vapor pressure of the latter is less than the vapor pressure in the intercellular spaces. In general, stomates are open in the light, and closed in the dark; and as a consequence, one would expect that night transpiration is less than day transpiration. Variations in night transpiration depend on the buoyancy flux; and cyclical venting and heating of greenhouses is often resorted to in order to maintain the humidity at acceptable levels.

The present invention is based on the discovery that the rate of transpiration of plants in a greenhouse under low light level conditions is related to the extent of intermittent interactions of the leaf structure of the plants with air whose temperature fluctuates. Such interactions are the result of thermal gradients in the greenhouse which produce turbulent, thermal convective air currents throughout the greenhouse, and particularly across the plant canopy. Thus, plant transpiration at night, or during other periods of low levels of light, is functionally dependent on the buoyancy flux, or thermal convection, in the greenhouse.

More technically, the buoyancy flux B is given by:

$$B = (g)[\overline{w'T'}]/T \quad (1)$$

where
g is the gravitational constant;
T is enclosure air temperature (°K.);
w' is the fluctuations in vertical air velocity w, where $w = \overline{w} + w'$ (usually, $\overline{w} = 0$)
T' is the fluctuations in air temperature T, where $T = \overline{T} + T'$;
$\overline{X}$ means the average of X over time;
$[X]$ means the average of X over the enclosure space; and
$[\overline{w'T'}]$ means w' multiplied by T' averaged over time and space.

Plants in a greenhouse with the configuration of FIG. 1, will produce more water vapor than plants in a greenhouse with the configuration shown in FIG. 2 under low light level conditions in the same environment. The conventional approach to reducing humidity in the greenhouses only exacerbates matters and increases the heating requirements of the greenhouses as seen from the positive feedback mechanism illustrated in FIG. 3. The plants produce water vapor during periods of low light levels such as at night increasing the humidity to unhealthy levels. Ventilation of the greenhouse is required to reduce humidity to acceptable levels removing latent heat contained in the vapor that is vented as well as sensible heat in both the vapor and the air. Heating is required to replace the heat lost to the atmosphere by the venting of the greenhouse, and the plants are encouraged to produce more water vapor by the thermal convective air flow through the plant canopy as the air currents in the greenhouse stabilize following the venting and heating operations. FIG. 4 shows the cyclical nature of the heating and ventilating cycles of a greenhouse. The result is a situation that feeds upon itself and results in added stress on the plants and a large heat load on the greenhouse.

The problem has been determined to be the result of the buoyancy flux in the greenhouses. That is to say, the buoyancy flux in the configuration of FIG. 1 is relatively higher than the buoyancy flux in the configuration of FIG. 2. From actual experiments, it has been found that in similar greenhouses with the same environmental conditions, the buoyancy flux of the greenhouse that is less insulated and thus requires more heating, will be larger and the plants will produce more water vapor.

Reducing the buoyancy flux in a greenhouse, i.e., reducing the rate of thermal convection of air throughout the greenhouse, and particularly across the canopy of the growing plants during periods of low light levels, will reduce the heat load on the greenhouse during these periods. In order to reduce the buoyancy flux, the greenhouse should be well insulated (thereby reducing the amount of heat that must be supplied to the greenhouse), and/or venting of the greenhouse should be reduced, and moisture should be removed from the greenhouse, preferably by a latent heat converter such as a heat pump mechanism thereby reducing the need to ventilate the greenhouse. Plant transpiration under low light levels conditions will be reduced thereby producing a negative feedback situation that will reduce the heat load on the greenhouse.

A suitable latent heat converter for carrying out the present invention is a heat pump that presents a cold surface to the air in the greenhouse effecting condensation of water vapor in the air, wherein, normally, latent heat is transferred to an organic or cryogenic fluid the evaporator of the heat pump. A compressor is used to elevate the temperature of the heat absorbed and now contained in the organic or cryogenic fluid, with this heat being transferred back to the greenhouse air at an organic fluid condenser of the heat pump. The preferred latent heat converter, however, is an air-brine-vapor heat exchanger of the type disclosed herein, and also disclosed in U.S. Pat. Nos. 4,707,995, 4,803,846, or 4,819,447, or of the type disclosed in U.S. patent applications Ser. No. 780,285 filed Sep. 26, 1985, or Ser. No. 316,915 filed Feb. 28, 1989, the disclosures of all of which are hereby incorporated by reference. In such a heat exchanger, concentrated brine in a reservoir is applied as a thin film over a screen arrangement though which air from the greenhouse passes. Because the brine is hygroscopic, water vapor in the air condenses on the brine and the vapor gives up its latent heat to the brine. Alternative arrangements are shown in FIGS. 5 (wherein a ground-level heater is provided) and in FIG. 6 (wherein a ceiling level heater is provided).

Preferably, in both cases, a well insulated greenhouse is utilized. The heat exchangers or dehumidifiers in the greenhouses are operated during periods of low light levels such as at night. During such periods, the heaters are operated as needed to maintain the temperature at a desired level. As a result, venting of the greenhouse is minimized. Buoyancy flux through the plant canopy are minimized because of the minimizing of the venting operation. Consequently, plant transpiration is minimized during these periods, and the heat load on the greenhouse is reduced as a consequence.

The preferred type of heat exchanger is in accordance with the disclosures in the above-identified patents and patent applications. A further description of such heat exchangers disclosed in these patents is contained in the article "LHC—The Latent Heat Converter" by G. Assaf appearing in *Heat Recovery Systems*, Vol. 6, No. 5, pp 369– 379, 1966, which is hereby incorporated by reference. Such types of heat exchangers permit ventilation of air to and from the enclosure to be minimized and thus minimize the buoyancy flux because, when ventilation is minimized, the heated air in the enclosure will collect at the top of the enclosure. To enhance its efficiency, the latent heat converter or heat pump can be supplemented with what is termed a night thermal screen which is an added layer of insulation applied to an enclosure at night to provide additional thermal protection against heat loss.

As shown in FIG.5, well insulated greenhouse 20 includes heat exchanger 21 constructed in accordance with the patents, the article, and patent applications mentioned above for dehumidifying the air in the greenhouse. During low light levels, such as at night, when plants 22 are quiescent, and the ambient temperature is low, e.g., less than during daylight hours, ventilation of the greenhouse is minimized. Thus, vent 23, whose operation is normally controlled by controller 24 in response to humidity probes 26 located in the greenhouse, is adjusted so that the normal cycling of venting, heating, venting can be suspended. As described in the patents and patent applications mentioned above, dehumidifier 21 can advantageously operate under conditions of substantially constant enthalpy to dehumidify the air in the greenhouse and by extracting and converting latent heat from water vapor in the air as the vapor condenses on the brine to sensible heat which is transferred back, almost immediately, to the air in the greenhouse. Thus, simultaneously operating heater 25 in combination with the dehumidifier will permit the heater to operate at a substantially low, or reduced level. The elimination of water-vapor by dehumidifier 21 reduces the need for ventilating the greenhouse thus reducing the need for ventilating the greenhouse thus reducing the number of times during the night that a buoyancy flux will exist. This suppresses transpiration and allows heater 25 to replace the heat losses without significantly increasing the buoyancy flux. Furthermore, preferably heated greenhouse air exits the dehumidifier above the plant canopy. The result is a reduction in the buoyancy flux in the greenhouse and a reduction in the transpiration rate of the plants all to the end that the total energy requirement of the system is reduced. A similar result is achieved by the arrangement shown in FIG. 6.

In a further embodiment of the invention, a heat exchanger similar to that disclosed in U.S. Pat. No. 4,803,846 can be used. As shown in FIG. 7, brine in reservoir 11B is pumped to air-brine-vapor heat exchanger 50 (shown as a brine shower) through which air in greenhouse 13B, which preferably is well insulated, passes by reason of the operation of blower 51. After contacting the air and absorbing water vapor in the air, the brine returns to reservoir 11B. Heat is supplied to the air in the enclosure, when necessary, by providing indirect heat exchanger 52 shown located in the path of the air exiting heat exchanger 50, for example, heat exchanger 52 being supplied with hot water from boiler 40 used to regenerate dilute brine.

The regeneration process, and venting of the greenhouse, are carried out by contacting dilute brine collected in reservoir 11B with air extracted from the enclosure by the operation of blower 57 and vented to the atmosphere through duct 60 located, for example, above the plant canopy. The brine is contacted with the air at 56 after the air is heated to a temperature above that of the brine by heat exchanger 54 supplied with water from the boiler. The result is that the dilute brine gives up water to the air and is concentrated before being returned to reservoir 11B. Preferably, reservoir 55 and pump 53 are provided for ensuring a relatively high brine flow rate (approximately 1000 liters per hour) to direct contact air-brine-vapor heat exchanger 56, with concentrated brine being returned to reservoir 11B via overflow conduit 61. Heat contained in the air that is vented is extracted and returned to the enclosure downstream of the contact of the dilute brine with the vented air. This is achieved by heat exchange surface 58 contacted on one side by air in the enclosure, and on the other side by the moist air being vented. Additional heat is extracted from the vented air by reason of its contact with heat exchange surface 62, acting as an air heat recuperator, for transferring heat to air entering the enclosure through duct 63.

Preferably, the flow rate of enclosure air across heat exchange surface 58 is approximately 3,000 Kg/hr, while the preferred flow rate of air exiting the regenerator is about 1,0000 Kg/hr. In such case, the flow rate of air entering the enclosure is approximately 1,000 Kg/hr.

In variations, the indirect heat exchangers 52 and 54 could be eliminated, and heating of the brine can be effected using flue gases with air, for example, as is shown in FIG. 7A. Alternatively, a heat exchanger, or air heater such as a shell-and-tube arrangement can be used for indirectly heating, preferably, enclosure air using flue gases as shown in FIG. 7B. After being heated, the air is contacted with brine in heat exchanger 56 (FIG. 7) to reconcentrate the brine. Before being exhausted from the enclosure, the warmed and moistened air is passed though indirect-type heat exchangers for transferring some of the sensible heat and latent heat in the air to the air in the enclosure and to the replacement air.

While the foregoing description refers to night-time as an example of a period of low light level, the present invention is specifically applicable to other periods of time of low light levels such as may occur during periods of cold, cloudy, misty, or rainy weather, etc.

Even though the above description refers to the buoyancy flux as the rate of convective heat flow of air through the plant canopy, this term should be considered to refer as well to the general rate of convective heat flow of air in the greenhouse. Thermal convection can be induced by cold air which cools the roof, by heating elements, by penetration of cold outside air in to the warmer greenhouse, or by cold walls. Thermal convection is also associated with buoyancy flux which is defined by equation (1).

Referring now to FIG. 8, a further embodiment of the present invention is shown wherein greenhouse 10C is provided with heater 52C for heating the greenhouse when necessary, such as during periods of low light levels like at night using, for example, hot water being supplied from boiler 40C. Air is exhausted from the greenhouse, using fan 57C, via conduit 60C. Air inlet conduit 62C contained within conduit 60C permits replacement air to enter the greenhouse at a location below the plant canopy, the replacement being air, such as ambient air, whose temperature is lower than the temperature of the greenhouse air.

Warm air exhausted from the greenhouse via conduit 60C transfers heat across the wall of conduit 62C to replacement air entering the greenhouse through conduit 62C in a recuperative fashion. Because sensible and latent heat contained in the air exhausted from the greenhouse is transferred to the replacement air, the temperature of the replacement air will be greater than ambient air. Hence, less heat must be added to the greenhouse than would be the case were unheated ambient air used as replacement air. In addition, because of the location of the vent and replacement air duct with respect to the plant canopy (i.e., below the plant canopy), all contributing to the reduction of the buoyancy flux of the air across the plant canopy. As indicated above, this has the beneficial result of reducing plant transpiration during periods of low light levels, such as nighttime, and thus reducing the amount of air that must be exhausted from the greenhouse to control humidity.

In the embodiment of the invention shown in FIG. 9, which is considered to be the best mode for carrying out the invention, an arrangement similar to that shown in FIG. 7 is used wherein the buoyancy flux is also reduced by heating the inlet air to a temperature close to, or a few degrees above that of the air in the greenhouse.

Brine in reservoir 11D is pumped to air-brine-vapor heat exchanger 50D (shown as a brine shower) through which air in greenhouse 13D, which preferably is well insulated, passes by reason of the operation of blower 51D. After contacting the air and absorbing water vapor from the air, the brine returns to reservoir 11D. Air-brine-vapor heat exchanger, or dehumidifier 50D, operates under conditions close to substantially constant enthalpy to dehumidify the air in the greenhouse. That is to say, latent heat in the water vapor in the air is extracted as the vapor condenses on the brine, and is converted to sensible heat which is transferred back, almost immediately, to the air in the greenhouse. Heat is supplied to the air in the greenhouse, when necessary, by providing indirect heat exchanger 52D located, for example, in the path of the air exiting heat exchanger 50D. Heat exchanger 52D is preferably a radiative heater, e.g., an infrared heater, whereby heat is transferred to the greenhouse, and in particular to the plants, mainly by long-wave radiation flux, and only a relatively small fraction of heat is transferred to the greenhouse by convection. By using such heaters, buoyancy flux will be suppressed; and consequently, the effect on transpiration of the plants will be minimal. Preferably, heated greenhouse air, heated by sensible heat transferred from the brine in dehumidifier 50D, exits the dehumidifier above the canopy of the plants, consequently also contributing to a reduction in the buoyancy flux in the greenhouse.

The regeneration process, and venting of the greenhouse, are carried out by contacting dilute brine collected in reservoir 11DE, preferably, with air extracted from the enclosure by the operation of blower 57 and vented to the atmosphere through duct 60 located, for example, above the plant canopy.

In FIG. 9, air vented from the enclosure is first heated indirectly by flue gases in an air heater, shown as shell-and-tube heater 54D, and the heated air is then contacted with the brine in the air-brine-vapor direct contact heat exchanger 56D. Alternatively, the regeneration process can be carried out external to the greenhouse or enclosure using air other that of the enclosure. Preferably, as usually is the case in the embodiment shown in FIG. 7, a large portion of the brine regeneration, process will take place under conditions close to constant enthalpy,such that the heated air cools at close to constant wet bulb temperature as it absorbs water vapor evaporated from the brine. In such a manner, high efficiency levels will be guaranteed in the regeneration process, since if brine regeneration is not carried out at constant enthalpy, only a relatively small amount of water will be evaporated form the brine, and the heat involved will merely raise the temperature of the brine. Thus, by ensuring that most of the regeneration process takes place at close to conditions of constant enthalpy,-relatively high temperature heated air will ensure high enthalpy (and temperature) of the brine at the brine-air interface, and consequent high vapor content of the air exiting the direct-contact heat exchanger. Under such conditions, the efficiency of the regenerator will be increased. Sensible and latent heat added to and contained in the vented air can be transferred to air in the greenhouse across the walls of duct 60D.

Alternatively, air exiting the regenerator can be vented directly to the ambient air with minimal or no transfer of latent or sensible heat contained in the vented air to air in the enclosure. Furthermore, air exiting the regenerator, particularly when the regeneration is carried out external to the enclosure, can be used for other purposes, e.g., heating other enclosures, etc.

There are a number of drawbacks to operating the regenerator at high temperatures. First, high temperatures may cause damage to materials used in the construction of the regenerator. Thus is especially true, as in the case of the present embodiment, when the regenerator is made from plastic materials using polymer adhesives, and a paper matrix web is used in the construction of the air-vapor-brine direct contact heat exchanger, all for the purpose of operating in the presence of hygroscopic brine which becomes highly corrosive when it absorbs oxygen on being exposed to air at relatively high temperatures. Second, a larger heat transfer surface area will be necessary in air heater 54D when high temperatures are used because of the relatively small temperature difference across the heat transfer surface between the flue gases and hot air in heater 54D. Furthermore, to ensure that high temperature brine does not reach air-brine-vapor direct contact heat exchanger 50 (FIG. 7) or 50D (FIG. 9) and consequently reduce the effectiveness of the brine in absorbing water vapor, a brine-brine heat exchanger or recuperator can be used (such as shown in U.S. Pat. No. 4,841,740, the disclosure of which is hereby incorporated by reference), or as shown in FIG. 9C. Alternatively, the amount of brine exchanged between the regenerator and heat exchanger 50 or 50D respectively can be minimized. In this manner, operation at close to constant enthalpy conditions are guaranteed.

In the present invention, it is preferred to reduce the amount of brine exchanged between the regenerator and heat exchanger 50 or 50D respectively, or in other words to reduce the brine flow rate to the regenerator. Even so, sufficient flow must be maintained to ensure that the brine does not crystallize and that it does not become too concentrated inasmuch as the more concentrated the brine, the more difficult it is to evaporate water.

In accordance with the present invention, the rate of brine flow to the regenerator should be at least twice the rate at which water vapor is absorbed by the absorber or air-brine heat exchanger 50D, and is evaporated from the brine in the regenerator, and not more than 40 times larger. When the brine contains calcium chloride or magnesium salts, the preferred rate of brine flow to the regenerator should be approximately ten times larger than the rate at which water is evaporated from the brine in the regenerator. For example, if the rate of evaporation in the regenerator is approximately 20 Kg/hr., the rate of flow of brine to the regenerator should be around 200 Kg/hr. with the rate of flow of brine to the air-vapor-brine heat direct contact exchanger (50 or 50D) being approximately 2,000 Kg/hr. such that the brine absorbs about 20 liters/hr. of water vapor from the air in the enclosure. In such case, approximately 74% of the energy or enthalpy supplied to the brine is used to evaporate water vapor from the brine, there being about a 26% deviation from constant enthalpy operation. The activity of the brine (equivalent to relative humidity, and being a measure of the hygroscopy of the brine) should be about 50% in the heat exchanger (50 or 50D), and about 40% in the regenerator.

In addition, the temperature of the hot-air entering air-vapor-brine direct contact heat exchanger 56 or 56D respectively should be between about 30° to 200° C., and preferably about 100° C. At temperatures below about 30° C., the evaporation process is not efficient.

The psychrometric chart shown in FIG. 10 maps an example of the conditions of the brine at the air-brine interface in the regenerator. As shown, enclosure air at 16.5° C. (point 0) is heated to 65° C. (point 7) and then contacted with dilute brine in the regenerator. If the brine flow rate to the regenerator were zero, then the air would be cooled by the brine along the line 7-1, which is a line of constant enthalpy (28° C. wet bulb temperature). The dilute brine in contact with this air is concentrated as water is evaporated under conditions of constant enthalpy. This represents the ideal operation because it is the most efficient way to concentrate the brine; but it is virtually impossible to achieve this operation in actual practice because, absent a supply of fresh, dilute brine, the brine in the regenerator will crystallize.

It is therefore necessary to operate along a line that deviates from the constant enthalpy line; and this is suggested by the line 7-2 in FIG. 10. In this case too, enclosure air is heated to 60° C. before being contacted with dilute brine in the regenerator, but dilute brine is added to the regenerator during the regeneration process resulting in a deviation from the line of constant enthalpy. Preferably, the deviation should be minimized; and this is accomplishes by minimizing the flow rate of the brine to the regenerator. If the flow rate of brine is too large for the regenerator, operation will be along the line 7-3, and the deviation form conditions of constant enthalpy will be larger than necessary resulting in a less efficient manner of regenerating the brine.

In general, a relationship exists between the operation of the regenerator wherein dilute brine is concentrated by evaporating water therefrom by reason of contact of the dilute brine with heated air, and the operation of the direct contact heat exchanger or dehumidifier in the enclosure wherein concentrated brine from the regenerator is diluted by the condensation of water vapor in the enclosure air onto the brine. Specifically, if the regenerator operates under conditions of constant enthalpy as indicated by line 7-1, the direct contact heat exchanger in the enclosure will operate under conditions of constant enthalpy along the line 0-1'. Conditions of operation along the line 7-2 in the regenerator are associated with operation of the direct contact heat exchanger in the enclosure along the line 0-2'etc.

The heat exchanger in the enclosure would operate most efficiently if operation were along a line of constant enthalpy (i.e., along the line 0-1') because, under these conditions, 1.7 grams of water would be removed from each kilogram of air in the enclosure. When operating along the line 0-2' only 1.5 grams of water is removed; and if operation were along the line 0-3', only 0.3 grams of water would be removed. Thus, excess deviations from constant enthalpy operation in the regenerator causes a severe reduction in the efficiency in the operation of the dehumidifier in the enclosure.

In the preferred embodiment, enclosure air is heated to 100° C. before contacting the dilute brine in the regenerator, and a slight deviation from constant enthalpy conditions is involved in the operation of the regenerator as indicated at point 4 in FIG. 10. Such operation of the regenerator is associated with the operation of the dehumidifier operating under conditions shown in FIG. 10 by line 0-2', conditions also slightly deviating from constant enthalpy. The flow rate of the brine in the dehumidifier is approximately 100 times the rate of condensation of water vapor in the greenhouse air on the brine in the dehumidifier while the flow rate of brine to the regenerator is ten times the rate of condensation. The temperature of the air or gases netering direct contact heat exchanger 56D is preferably about 100° C.

Although in FIG. 9, indirectly heated air is used in the regeneration of the brine, other methods for regenerating the brine can be used, e.g., using directly flue gases or air heated directly by flue gases to heat the brine (as shown in FIG. 7A).

In this embodiment, replacement air (whose temperature is, for example, below the temperature of the air in the greenhouse) entering the greenhouse through opening 62D is heated by hot water heater 64D so that the air exiting the heater and entering the greenhouse is warmer than the air in the green house. Positioning opening 62D in the upper portion of the greenhouse, above the plant canopy, will thus produce a further reduction in the buoyancy flux of the air in the greenhouse because the replacement air, being warmer than the air in the greenhouse at the level of the plants, will not spill down toward the floor. Consequently, during ventilation of the greenhouse, convection of air through the canopy is suppressed; and transpiration of the plants is suppressed.

Alternatively, opening 62D can be positioned in the lower portion of the greenhouse, for example, below the plant canopy if the replacement air, which is usually cooler outside air, is heated merely by air present in the greenhouse (i.e., without using a heater such as heater 64D) in order to bring about a further reduction in the buoyancy flux. Such a reduction is achieved because usually the replacement air, even when heated by the greenhouse air, will remain cooler by a few degrees, for example, than the remainder of the air in the greenhouse. Consequently, the replacement air remains close to the floor of the greenhouse and does not rise through the canopy or contribute to movement of air in the greenhouse.

Furthermore, while as a general rule, reduced ventilation will lead to the reduction of buoyancy flux as mentioned above, the greenhouse should also preferably be sealed against any leakages of ambient air into the greenhouse since, normally the leakage of ambient air into the greenhouse will also bring about an increase in the buoyancy flux.

While the above description refers to ways and means of reducing the buoyancy flux of air in a greenhouse or an enclosure where plants are found, the present invention also can be used to regulate or even increase the moisture level in such enclosures where necessary. This can be achieved by using a control on the buoyancy flux or heat convection of air in the greenhouse in order to control plant transpiration. Thus, for example, the buoyancy flux can be increased by increasing the ventilation rate, bringing about an increase in plant transpiration with the increased buoyancy flux. Also, heating of air in the greenhouse by a heating system located on or in the vicinity to the floor of the greenhouse also causes an increase in the buoyancy flux and plant transpiration. In such case, convection heaters advantageously can be used because they will also bring about an increase in the heat convection or buoyancy flux of the air throughout the greenhouse, and this cause an increase in plant transpiration.

Consequently, regulation of the venting of air from the greenhouse, for example, can be used to control plant transpiration during periods of low light levels such as at night wherein preferably a latent heat converter is used to dehumidify the air in the greenhouse being heated by a suitable heater if necessary. Therefore, in accordance with this aspect of the present invention, the heat load on an enclosure or condition of air in an enclosure can be governed by controlling the buoyancy flux of the air in the enclosure.

In addition, although the above description refers to methods of and means for reducing or controlling the buoyancy flux of the air in a greenhouse, the present invention, and particularly the embodiments shown in FIGS. 7, 7A, 7B and 9, is specifically applicable for use in controlling the condition of the air in almost any enclosure, for example, greenhouses, mushroom houses, animal enclosures, enclosed swimming halls, enclosed ice-rinks, stores, warehouses, and any other enclosure having sources of humidity. In such situations, air-brine-vapor direct contact heat exchanger 50 shown in and described in relation to FIG. 7 (or 50D in FIG. 9) is used to dehumidify the air in the enclosure preferably under conditions of close to substantially constant enthalpy, converting latent heat from water vapor in the air as the vapor condenses on the brine to sensible heat which is transferred almost immediately back to the air in the enclosure. Diluted brine produced by such operations is returned to reservoir 11B shown in FIG. 7 (or 11D shown in FIG. 9), with brine from the reservoir being regenerated by contacting dilute brine from reservoir 11B shown in FIG. 7 (or 11 D shown in FIG. 9) preferably with heated air which is vented to the atmosphere as described above. Sensible heat and latent heat contained in the air that is vented can be transferred to replacement air as well as to air in the enclosure as described above.

Preferably, indirect heat exchangers, shown as heat exchanger surfaces 58 and 62 in FIG. 7, and wall of duct 60D in FIG. 9 are constructed as inflatable plastic film ducts. In order to provide a large heat exchange area, such ducts should be of large diameter, and would consequently take up a large volume. In order to minimize their volume, the ducts, preferably can be constructed as narrow ducts. In the embodiment shown in FIG. 7, the ducts can be arranged one inside the other. This is further illustrated in FIG. 9A. In order to maintain their shape as narrow ducts, especially when air is flowing therethrough, the ducts can be seamed or stitched in a manner similar to that shown in FIG. 9B so as to provide support while at the same time to permit air to flow freely through the ducts in an effective manner. Such an arrangement is particularly advantageous in enclosed swimming halls.

If unusually high humidity conditions occur in the enclosure, then the direct contact heat exchanger or absorber (shown as 50 in FIG. 7, and at 50D in FIG. 9) may collect more water vapor from the air than the brine regenerator or concentrator is capable of removing. In such case, the brine level in reservoir 11 (FIG. 7) or reservoir 11D (FIG. 9) will rise. Preferably, the reservoir should be double the size of the volume of brine present in the reservoir under normal conditions.

To ensure that no overflow of brine in the reservoir occurs, due for example to a malfunction in the regenerator, high brine level detector 67 (FIG. 7) or 67D (FIG. 9) is utilized for sensing an overflow condition and stopping the operation of the direct contact heat exchanger and/or brine regenerator if necessary. Low brine level detector 69 (FIG. 7) or 69D (FIG. 9) can be used to stop the operation of the regenerator if the level of brine in the reservoir drops due, for example, to the presence of low humidity levels in the enclosure. Level detector 68 (FIG. 7) or 68D (FIG. 9), which s used to indicate the return of the brine level to its nominal value, can be employed to renew the operation of the brine regenerator.

Alternatively, thermistor 65D can be used to sense the temperature of the brine in the regenerator in order to stop the operation of the regenerator when the brine temperature rises above a certain level, e.g., 50° C. Such a high temperature will occur if the concentration of the brine therein is high also giving an indication that the level in reservoir 11 (FIG. 7) or 11D (FIG. 9) has dropped to such an extent that a danger exits that crystallization may occur.

Thermistor 66D, on the other hand, positioned in the heated air flow prior to its contact with the brine in direct contact heat exchanger 56D can be used to stop the hot air flow if the air temperature goes above a threshold value, e.g., 150° C. which would be detrimental to the regenerator.

Although the above-description refers to a system operating to dehumidify air in an enclosure, the systems, particularly those described in relation to FIGS. 7 and 9, if warranted, can be used as a humidifier. In such case, the operation of the regenerator should be stopped, permitting the system to contain brine sufficiently dilute in order for direct contact heat exchanger 50 or 50D to function as a humidifier. Here, the brine will have an activity level similar to fresh water. Alternatively, the brine in the system can be removed, on a seasonal basis if preferred, and replace with fresh water.

The advantages and improved results furnished by the method and apparatus of the present invention are apparent from the foregoing description of the preferred embodiments of the invention. Various changes and modifications may be made without departing from the spirit and scope of the invention as described in the appended claims.

We claim:

1. In combination:
   a) a greenhouse containing growing plants defining a plant canopy within the greenhouse; and
   b) a vent for selectively exhausting air from the greenhouse;
   c) a duct located above the plant canopy for carrying ambient air that replaces air exhausted through said vent; and
   d) means for heating the air that flows through said duct so that the replacement air is warmed before it encounters the plant canopy.

2. The combination of claim 1 wherein said means for heating the air is constructed and arranged to effect heat transfer between the air exhausted from the greenhouse and the air that flows through said duct.

3. The combination according to claim 1 including:
   a) a first air-brine-vapor heat exchanger for contacting air in the greenhouse with concentrated brine supplied from a reservoir and thereby dehumidifying the air and producing dilute brine that is returned to the reservoir;
   b) a second air-brine-vapor heat exchanger supplied with brine from said reservoir for contacting air exhausted from the greenhouse;
   c) means for heating the exhausted air before it is contacted by the second heat exchanger;
   d) said second air-brine-vapor heat exchanger being constructed and arranged so that the heated air evaporates water from the contacted brine for concentrating the same before the latter is returned to the reservoir and for increasing the humidity of the exhausted air; and
   e) heat exchanger means responsive to the humidified air for transferring heat contained therein back to the greenhouse.

4. The combination of claim 3 wherein said first heat exchanger is constructed and arranged such that it operates under conditions close to constant enthalpy.

5. The combination of claim 3 wherein said heat exchanger means is constructed and arranged so that sensible heat in the exhausted air is transferred to the ambient air added to the greenhouse.

6. The combination of claim 1 wherein said means for heating the air is constructed and arranged so that latent heat in the exhausted air is transferred to the air in the greenhouse.

7. The combination of claim 1 wherein said means for heating the air is constructed and arranged so that latent heat in the exhausted air is transferred to the air in the greenhouse, and sensible heat in the exhausted air is transferred to the ambient air added to the greenhouse.

8. The combination of claim 1 wherein said means for heating the exhausted air includes an indirect heat exchanger to which hot fluid is supplied.

9. The combination of claim 8 wherein said fluid is water.

10. The combination of claim 8 wherein said fluid is hot flue gases.

11. A method for reducing the heat load on a greenhouse during periods of low light level when the temperature and humidity of the ambient air are lower than the temperature and relative humidity of the air in the greenhouse comprising dehumidifying the air in the greenhouse under conditions close to constant enthalpy such that the latent heat of condensation of water vapor is transferred back to the air in the greenhouse, and including the step of contacting the air in the greenhouse with concentrated brine to produce drier air and dilute brine, and regenerating the dilute brine by contacting it with air vented from the greenhouse, the vented air being heated before contacting the dilute brine.

12. A method according to claim 11 including the step of transferring some of the heat in the air vented from the greenhouse to ambient air that replaces the vented air, the transfer of heat taking place downstream of the contact of the dilute brine with the vented air.

13. A method according to claim 11 including the step of transferring some of the heat in the air vented from the greenhouse back to air in the greenhouse, the transfer of heat taking place downstream of the contact of the dilute brine with the vented air.

14. A method for controlling the condition of air in a greenhouse containing plants having a canopy, said method comprising:
   a) exhausting air from the greenhouse during periods of low light levels for controlling humidity in the greenhouse;
   b) replacing air exhausted from the greenhouse at a location below the plant canopy; and
   c) heating the replacement air by exchanging heat with the air exhausted from the greenhouse.

15. A method according to claim 14 including contacting the air in the greenhouse with concentrated brine from a reservoir for dehumidifying the air and producing dilute brine which is returned to the reservoir.

16. A method according to claim 15 including heating air and contacting brine from the reservoir with the heated air for concentrating the brine and producing moistened air.

17. A method for reducing the heat load on a greenhouse containing plants having a canopy, said method comprising;
   a) exhausting air from the greenhouse during periods of low light levels; and
   b) replacing the air exhausted from the greenhouse with heated ambient air such that the rate of convective heat flow across the plant canopy is reduced by heating the air in the greenhouse with heaters located in the upper portion of said greenhouse above the plant canopy.

18. A method for reducing the heat load on a greenhouse containing plants having a canopy, said method comprising;
   a) exhausting air from the greenhouse during periods of low light levels; and
   b) replacing the air exhausted from the greenhouse with heated ambient air such that the rate of convective heat flow across the plant canopy is reduced by dehumidifying the air in the greenhouse using a direct contact air-brine-vapor heat exchanger wherein said heat exchanger is constructed and arranged such that the latent heat of condensation of vapor in the air in the greenhouse condensing on the brine in the heat exchanger increases the sensible heat of the brine and the sensible heat is transferred to the air in the greenhouse whereby the heat exchanger operates under conditions of close to substantially constant enthalpy.

19. A method according to claim 18 wherein said heat exchanger is constructed and arranged such that greenhouse air exiting the heat exchanger and heated by sensible heat of the brine in the heat exchanger exits at a level above the plant canopy in the greenhouse.

20. A method for controlling the condition of air in an enclosure containing growing plants, said method comprising:
a) exhausting air from the enclosure during periods of low light; and
b) controlling the heat convection of the air in the greenhouse by exhausting air from the enclosure through a vent and increasing the rate of air exhausted through the vent for increasing the moisture level of the air in the enclosure whereby heat convection of the air in the enclosure is increased.

21. A method for controlling the condition of air in an enclosure containing growing plants, said method comprising:
a) exhausting air from the enclosure during periods of low light; and
b) controlling the heat convection of the air in the greenhouse by exhausting air from the enclosure through a vent and heating the enclosure with heaters located near the ground level of the enclosure below the source of moisture.

22. In combination:
a) an enclosure having growing plants that provide a source of moisture;
b) vent means for selectively exhausting air from the enclosure;
c) a reservoir of brine;
d) a first air-brine-vapor heat exchanger for contacting air in the enclosure with concentrated brine supplied from said reservoir and thereby dehumidifying the air and producing dilute brine;
e) means for returning the brine form the first heat exchanger to the reservoir;
f) a second air-brine-vapor heat exchanger supplied with brine from said reservoir for contacting air exhausted from the enclosure;
g) means for heating the exhausted air before it is contacted by the second heat exchanger;
h) said second air-brine-vapor heat exchanger being constructed and arranged so that the heated air evaporates water from the contacted brine for concentrating the same before the latter is returned to the reservoir and for increasing the humidity of the exhausted air.

23. The combination according to claim 22 wherein said first heat exchanger is constructed and arranged such that it operates under conditions close to constant enthalpy.

24. The combination according to claim 22 wherein said second heat exchanger is constructed and arranged such that it operates under conditions close to constant enthalpy.

25. The combination according to claim 24 wherein said second heat exchanger is constructed and arranged such that the rate at which brine is received by the second air-brine-vapor heat exchanger is more than twice, and less than forty times, the rate of condensation of water vapor in the first air-brine-vapor heat exchanger.

26. The combination according to claim 25 wherein the rate at which brine is received by the second heat exchanger is about ten times the rate of condensation of water vapor in the first heat exchanger.

27. The combination according to claim 22 wherein the exhausted air is heated to a temperature of greater than about 30° C. and less than about 200° C.

28. The combination according to claim 27 wherein the exhausted air is heated to a temperature of about 100° C.

29. The combination according to claim 22 wherein said second heat exchanger is constructed and arranged such that latent and sensible heat are transferred to air from the enclosure.

30. The combination according to claim 22 wherein said second heat exchanger is constructed and arranged such that latent and sensible heat are transferred to air entering the enclosure.

31. In combination:
a) an enclosure containing growing plants that provide a source of moisture;
b) a reservoir of brine;
c) a first air-brine-vapor heat exchanger for contacting air in the enclosure with concentrated brine supplied from a reservoir and thereby condensing water vapor thereby dehumidifying the air and producing dilute brine;
d) means for returning brine from the first heat exchanger to the reservoir;
e) a second air-brine-vapor heat exchanger supplied with brine from said reservoir and with air for contacting the air with brine;
f) means for heating the contacted air in the second air-brine-vapor heat exchanger before the air is contacted by said second heat exchanger;
g) said second air-brine-vapor heat exchanger being constructed and arranged so that the heated air evaporates water from the contacted brine for concentrating the same before the latter is returned to the reservoir and for increasing the humidity of the air contacted with brine in said second heat exchanger.

32. The combination of claim 31 wherein said first heat exchanger is constructed and arranged such that it operates under conditions close to constant enthalpy.

33. The combination of claim 31 wherein said second heat exchanger is constructed and arranged such that it operates under conditions close to constant enthalpy.

34. The combination of claim 33 wherein said second heat exchanger is constructed and arranged such that the rate at which brine is received by the second air-brine-vapor heat exchanger is more than twice, and less than forty times, the rate of condensation of water vapor in the first air-brine-vapor heat exchanger.

35. The combination of claim 34 wherein the rate at which brine is received by the second heat exchanger is about ten times the rate of condensation of water vapor in the first heat exchanger.

36. Apparatus according to claim 34 wherein the exhausted air is heated to a temperature of greater than about 50° C. and less than 200° C.

37. Apparatus according to claim 34 wherein the air supplied to the second heat exchanger is heated to a temperature of about 100 C.

38. The combination of claim 34 wherein said second heat exchanger is constructed and arranged such that latent and sensible heat in the air contacted with the brine are transferred to air from the enclosure.

39. The combination of claim 34 wherein said second heat exchanger is constructed and arranged such that latent and sensible heat in the air contacted with the brine are transferred to air entering the enclosure.

40. A method for reducing the heat load on a greenhouse containing growing plants having a canopy during periods of low light levels by reducing the rate of convective heat flow of air through the canopy of the plants during said periods of time.

41. A method for controlling the heat load on a greenhouse containing growing plants during periods of low light levels by controlling the rate of convective heat flow of air through the canopy of the plants, including the steps of minimizing venting of the greenhouse, and heating and dehumidifying the greenhouse during said periods.

42. A method according to claim 41 wherein the step of dehumidifying the greenhouse is carried out utilizing a heat pump having a cold surface exposed to air in the greenhouse.

43. A method according to claim 41 wherein the step of dehumidifying the greenhouse is carried out utilizing a direct contact air-brine-vapor heat exchanger.

44. A method for using a latent heat converter to control the transpiration of plants in a greenhouse under low light level conditions, the method comprising the steps of:
 a) minimizing venting of the greenhouse during periods of low light level conditions;
 b) heating the greenhouse during such periods in a way that minimizes the rate of convective heat flow of air through the canopy of the plants; and
 c) using the latent heat converter to dehumidify the air in the greenhouse during such periods.

45. A method according to claim 44 wherein the step of dehumidifying the greenhouse is carried out utilizing a heat pump having a cold surface exposed to the air in the greenhouse.

46. A method according to claim 44 wherein the step of dehumidifying the greenhouse is carried out utilizing a direct contact air-brine-vapor heat exchanger that dehumidifies the air under conditions of substantially constant enthalpy.

47. A method according to claim 44 wherein the latent heat of condensation produced when the air in the greenhouse is dehumidified is returned to the air in the greenhouse.

48. A method for operating a greenhouse comprising the steps of:
 a) insulating the structure of the greenhouse to reduce the transfer of sensible heat through the structure;
 b) heating the greenhouse during periods of low light levels in a away that minimizes the flow of air currents through the canopy of the plants;
 c) minimizing the venting of the greenhouse during such periods; and
 d) dehumidifying the air in the greenhouse.

49. A method according to claim 48 wherein the step of dehumidifying the air in the greenhouse is carried out using a heat pump.

50. A method according to claim 48 wherein the step of dehumidifying the air in the greenhouse is carried out using a direct contact air-brine-vapor heat exchanger.

51. A method according to claim 50 wherein the heat exchanger is constructed and arranged as such that the latent heat of condensation of vapor in the air in the greenhouse on the brine of the heat exchanger increases the sensible heat of the brine, and the sensible heat is transferred back to the air in the greenhouse.

52. In combination:
 a) a greenhouse containing growing plants defining a plant canopy within the greenhouse; and
 b) means for reducing the rate of flow across the canopy due to thermal air currents during periods of low light levels.

53. In combination:
 a) a greenhouse containing growing plants defining a plant canopy within the greenhouse; and
 b) means for reducing the rate of flow across the canopy due to thermal air currents during periods of low light levels; and
 c) wherein the greenhouse includes vent means for selectively venting the greenhouse; control means for minimizing venting of the greenhouse at night; heater means for heating the greenhouse during said periods; and dehumidifier means for dehumidifying the greenhouse during said periods.

54. The combination according to claim 53 wherein said dehumidifier means includes a latent heat converter constructed and arranged to transfer to the air in the greenhouse the latent heat contained in the vapor that is condensed by the dehumidifier means 55. The combination according to claim 54 wherein said latent heat converter is in the form of a direct contact air-brine-vapor heat exchanger.

56. In combination:
 a) a greenhouse containing growing plants defining a plant canopy within the greenhouse;
 b) means for minimizing the rate of convective heat flow of air through the canopy during periods of low light levels;
 c) a first air-brine-vapor heat exchanger for contacting air in the greenhouse with concentrated brine supplied from a reservoir and thereby dehumidifying the air and producing dilute brine that is returned to the reservoir;
 d) means for exhausting air from the greenhouse to the atmosphere;
 e) a second air-brine-vapor heat exchanger supplied with brine from said reservoir for contacting the brine with air exhausted from the greenhouse;
 f) means for heating the exhausted air before it contacts the brine in by the second heat exchanger;
 g) said second air-brine-vapor heat exchanger being constructed and arranged so that the heated air evaporates water from the contacted brine for concentrating the same before the latter is returned to the reservoir and for increasing the humidity of the exhausted air; and
 h) heat exchanger means responsive to the humidified air for transferring heat contained therein back to the greenhouse.

57. The combination of claim 56 wherein said first heat exchanger is constructed and arranged such that it operates under conditions of substantially constant enthalpy.

58. A method according to claim 40 wherein said periods of low light levels include night-time.

59. A method according to claim 44 wherein said periods of low light levels include night-time.

60. A method according to claim 44 wherein said periods of low light levels include periods of cloudy weather.

61. A method according to claim 48 wherein said periods of low light levels include night-time.

62. The combination according to claim 52 wherein said periods of low light levels include night-time.

63. The combination according to claim 52 wherein said periods of low light levels include periods of cloudy weather.

64. A method according to claim 44 wherein the rate of convective heat flow of air through the canopy of the plants is minimized by heating the air in the greenhouse in such a way that temperature differences across the canopy are minimized.

65. A method according to claim 44 wherein the rate of convective heat flow of air through the canopy of the plants is minimized, when the greenhouse is vented and cooler replacement air flows into the greenhouse, by heating the replacement air as it enters the greenhouse, thereby reducing the buoyancy of the air below the canopy.

66. A method according to claim 48 wherein the rate of convective heat flow of air through the canopy of the plants is minimized, when the greenhouse is vented and cooler replacement air flows into the greenhouse, by heating the replacement air as it enters the greenhouse, thereby reducing the buoyancy of the air below the canopy.

67. A method according to claim 48 wherein the rate of convective heat flow of air through the canopy of the plants is minimized by heating the air in the greenhouse in such a way that temperature differences across the canopy are minimized.

68. The combination of claim 52 wherein said means for controlling includes means for reducing the buoyancy of the air below the plant canopy.

69. A method according to claim 41 wherein the process of dehumidifying the air is carried out under conditions of substantially constant enthalpy wherein the heat of condensation released when water vapor in the air is condensed is returned to the air almost immediately.

70. A method for using a latent heat converter to control the transpiration of plants in a greenhouse under low light level conditions, the method comprising the steps of:
  a) minimizing venting of the greenhouse during periods of low light level conditions;
  b) heating the greenhouse during such periods in a away that minimizes the rate of convective heat flow of air through the canopy of the plants; and
  c) using the latent heat converter to dehumidify the air in the greenhouse during such periods;
  d) wherein the latent heat converter that dehumidifies the air is operated such that dehumidification is carried out under conditions of substantially constant enthalpy wherein the heat of condensation released when water vapor in the air is condensed is returned to the air almost immediately.

71. A method according to claim 48 wherein the step of dehumidifying the air is carried out under conditions of substantially constant enthalpy wherein the heat of condensation released when water vapor in the air is condensed is returned to the air almost immediately.

72. A combination comprising:
  a) a greenhouse containing growing plants defining a plant canopy within the greenhouse; and
  b) means for controlling the rate of convective heat flow of air through the canopy during periods of low light levels;
  c) wherein the greenhouse includes vent means for selectively venting the greenhouse; control means for minimizing venting of the greenhouse at night; heater means for heating the greenhouse during said periods; and dehumidifier means for dehumidifying the greenhouse during said periods; and
  d) wherein said dehumidifier means is constructed and arranged to dehumidify the air under conditions of substantially constant enthalpy wherein the heat of condensation released when water vapor in the air is condensed is returned to the air almost immediately.

73. A method for reducing the heat load on a greenhouse during periods of low light levels by reducing the rate of convective heat flow of air through the plant canopy, said method comprising dehumidifying and heating the air in the greenhouse in order to maintain the average temperature of the air at a level desired for the plants, and in order to reduce venting of the greenhouse.

74. A method according to claim 73 including the step of insulating the structure of the greenhouse.

75. A method according to claim 73 wherein dehumidification of the air in the greenhouse is carried out using a direct contact air-brine-vapor heat exchanger supplied with brine from a reservoir.

76. A method according to claim 74 wherein dehumidification of the air in the greenhouse is carried out using a direct contact air-brine-vapor heat exchanger.

77. A method according to claim 75 wherein the latent heat of condensation of vapor in the air in the greenhouse released as the vapor condenses on the brine of said heat exchanger increases the sensible heat of the brine, and the sensible heat of the brine is transferred almost immediately to the air in the greenhouse.

78. A method according to claim 77 including the steps of:
  a) venting the greenhouse;
  b) heating air vented from the greenhouse prior to contacting the air with a second direct contact air-brine-vapor heat exchanger supplied with brine from said reservoir, and in which the heated vented air evaporates water from the contacted brine for concentrating the same thereby increasing the humidity of the vented air; and
  c) returning the contacted brine to said reservoir.

79. A method according to claim 78 including transferring heat from the vented air to the greenhouse.

80. A method according to claim 78 wherein heat from the vented air is transferred to replacement air entering the greenhouse.

81. A method according to claim 80 wherein the replacement air enters the greenhouse in the upper portion thereof.

82. A method according to claim 75 wherein the heat exchanger operates under conditions of substantially constant enthalpy.

83. A method according to claim 75 including the step of using a night thermal screen for providing thermal protection against heat loss.

84. A method according to claim 75 wherein said periods of low light level include night time.

85. A method according to claim 73 wherein said periods of low light level include cloudy weather.

86. In combination:
  a) a greenhouse containing growing plants defining a plant canopy within the greenhouse; and
  b) means for reducing the rate of convective heat flow of air through the canopy during periods of low light levels, said means for reducing including:

(1) a first air-brine-vapor heat exchanger for contacting air in the greenhouse with concentrated brine supplied from a reservoir to thereby dehumidify the air and produce dilute brine that is returned to the reservoir;

(2) means for exhausting air from the greenhouse to the atmosphere;

(3) a second air-brine-vapor heat exchanger supplied with brine from said reservoir for contacting air exhausted from the greenhouse with said brine and thus concentrating said brine;

(4) means for heating the exhausted air before it is contacted in the second heat exchanger; and (5) a heat exchanger for transferring back to the greenhouse heat contained in the exhausted air.

87. The combination according to claim 86 wherein said second heat exchanger is constructed and arranged so that the heated air evaporates water from the contacted brine for concentrating the same before the latter is returned to the reservoir.

88. The combination of claim 86 wherein said first heat exchanger is constructed and arranged so that it operates under conditions of substantially constant enthalpy.

89. The combination of claim 86 including means insulating the structure of the greenhouse.

90. Apparatus for reducing the heat load on a greenhouse containing plants defining a plant canopy during periods of low light levels comprising:

a) means for reducing the rate of convective heat flow of air through the canopy during periods of low light levels;

b) said means for reducing including a first air-brine-vapor heat exchanger for contacting air in the greenhouse with concentrated brine supplied from a reservoir to thereby dehumidify the air and produce dilute brine that is returned to the reservoir;

c) means for exhausting air from the greenhouse to the atmosphere;

d) a second air-brine-vapor heat exchanger supplied with brine from said reservoir for contacting air exhausted from the greenhouse with said brine and thus concentrating the brine;

e) means for heating the exhausted air before it is contacted in the second heat exchanger; and f) said second heat exchanger is constructed and arranged so that the heated exhausted air evaporates water from the contacted brine for concentrating the same before the latter is returned to the reservoir thereby increasing the humidity of the exhausted air.

91. Apparatus according to claim 90 including a heat exchanger responsive to said exhausted air having increased humidity for transferring back to the greenhouse heat contained in said exhausted air.

92. Apparatus according to claim 90 wherein said first heat exchanger is constructed and arranged so that it operates substantially under conditions of substantially constant enthalpy.

93. Apparatus according to claim 90 including means for insulating the structure of the greenhouse.

* * * * *